United States Patent
Riemersma

[15] 3,674,221
[45] July 4, 1972

[54] DYNAMIC STRESS-STRAIN TESTING OF RIBBONS OF FILM

[72] Inventor: Coenraad E. Riemersma, Springfield Township, Hamilton County, Ohio

[73] Assignee: The Proctor & Gamble Company, Cincinnati, Ohio

[22] Filed: May 13, 1970

[21] Appl. No.: 36,820

[52] U.S. Cl. ........................................... 242/75.51, 73/95.5
[51] Int. Cl. .................................. B65h 23/08, B65h 23/22
[58] Field of Search ............... 242/75.51, 75.45, 75.3, 75.4, 242/75.43, 75.44, 75, 67.2, 67.3; 73/95.5, 159, 160

[56] References Cited

UNITED STATES PATENTS

| | | | |
|---|---|---|---|
| 3,183,711 | 5/1965 | Duncan | 73/160 |
| 3,180,548 | 4/1965 | Stafford | 326/95 |
| 3,031,152 | 4/1962 | Cohen | 242/75.51 |
| 3,411,684 | 11/1968 | Tison | 226/25 |
| 3,241,785 | 3/1966 | Barrett | 242/75.51 |
| 3,250,488 | 5/1966 | Prager | 242/75.4 |
| 1,908,250 | 5/1933 | Huston | 242/75.51 |
| 2,923,150 | 2/1960 | Imboden | 73/159 X |

*Primary Examiner*—George F. Mautz
*Assistant Examiner*—Edward J. McCarthy
*Attorney*—John V. Gorman and Richard C. Witte

[57] ABSTRACT

This disclosure refers to an improved method and apparatus for dynamically, non-destructively testing ribbons of film to determine the stress-strain characteristics of the film under conditions substantially identical to the conditions to be imposed on the same film during subsequent processing. Specifically, a moving ribbon of film is first subjected to constant tension and is thereafter looped through a pair of constant surface speed nips, the surface speeds of which are selected to cause the film to elongate a pre-determined constant amount as it passes from one to the other. Total tension parallel to the machine direction of moving the film is continuously sensed in the looped film path intermediate the nips. Provision is made for continuously recording the total tension and for winding the tested film, under constant tension, into a roll of film.

14 Claims, 1 Drawing Figure

PATENTED JUL 4 1972 3,674,221
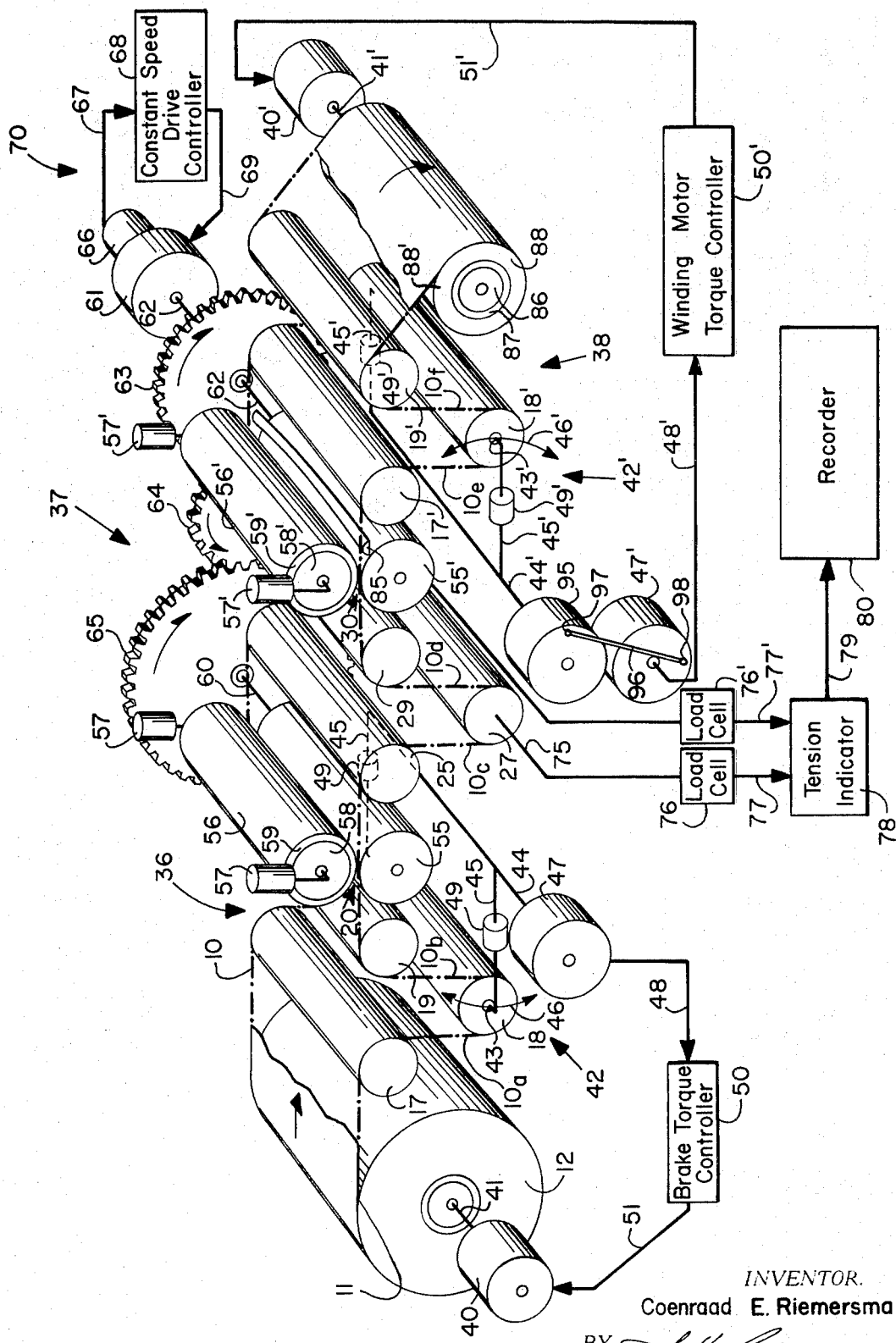
INVENTOR.
Coenraad E. Riemersma
BY [signature]
ATTORNEY

DYNAMIC STRESS-STRAIN TESTING OF RIBBONS OF FILM

BACKGROUND OF THE INVENTION

Quality control of each material entering a multi-material process is necessary to preclude wasting proportionate portions of good materials by processing them with sub-standard materials. Where film is one of a plurality of constituents used in a dynamic converting process such as manufacturing disposable diapers, it is common practice to use film supplied in roll form. The apparatus wherein such a process is performed is commonly and hereinafter referred to as a converter.

Distensible polymeric films, such as polyethylene film used as backsheets in manufacturing disposable diapers, have complex elasticity characteristics which are affected by converting velocity, the level of stress in the film in the machine direction, stress history, and the strain in the film in the machine direction. Stress-strain variations in ribbons of such film cut to length while discretely elongated and traveling at high speed through a converter, result in panels having unstressed length variability. Unstressed panel length variability may result in misregistration of the unstressed film panels with other product constituents in the converter.

Stress-strain variability over too broad a range in a ribbon of distensible polymeric film may ultimately precipitate costly rejection of converted product, converter jams and costly downtime, or make it necessary to run the converter at slow, inefficient production rates.

Therefore, it is desirable to know that the range of stress-strain variability of a rolled ribbon of film is satisfactory before it is committed to the converter. Through such knowledge it is possible to predict, with a high degree of certainty, which rolls of film can be used without experiencing the problems hereinbefore delineated.

It has heretofore been common practice to run quality control tests on samples of film taken from rolls of film stock. However, cutting samples from a roll of film to permit measuring stress-strain characteristics is a destructive operation since the tested film cannot thereafter be processed in a converter as hereinbefore described. Moreover, such testing is, at best, a spot check as contrasted with a more desirable testing of the entirety of a roll of film. Further, the static stress-strain property of the film is determined by such tests instead of the dynamic stress-strain properties, as affected by film velocity, stress, and strain imparted therein.

It has been found desirable, when testing rolls of distensible polymeric film for suitability for intended use under the dynamic conditions prevailing in a converter, to dynamically test the entirety, non-destructively, under simulated converter conditions. Continuously measuring and recording stress-strain characteristics of a ribbon of film comprising a roll, while subjecting it to simulated converter conditions, permits evaluation and segregation of rolls of film according to the range of stress-strain variability therein. That, in turn, promotes efficient converting when used in combination with empirically determined compensating converter registration adjustments or by not converting film having too much stress-strain variability.

For instance, suppose a 30 percent range of stress-strain variability could be tolerated in the converter without requiring adjustments of converter registration means. Further, suppose that film having optimum stress-strain N plus or minus 50 percent would be satisfactory from a product property point of view. Discrete roll A having stress-strain N ± 15 percent, roll B having stress-strain (N − 35%) ± 15%, and roll C having stress-strain (N + 35%) ± 15% would all be satisfactory although each might require different empirically determined settings of converter registration means. However, roll D having stress-strain of N ± X, where X is greater than 15%, would not be compatible with any fixed setting of the converter registration means. It will also be appreciated that if rolls can be arranged for use in groups, so that successive rolls have approximately equivalent average values of stress-strain, this would serve to minimize adjustments of converting equipment, thereby simplifying the operation.

OBJECTS OF THE INVENTION

It is an object of this invention to provide an improved method for determining the dynamic stress-strain characteristics of ribbons of distensible polymeric film of uniform width.

It is another object of this invention to provide an apparatus with which dynamic stress-strain characteristics of ribbons of distensible polymeric film can be determined.

It is a further object of this invention to provide a method and apparatus to non-destructively determine the dynamic stress-strain character of a rolled ribbon of distensible polymeric film over its entire length.

It is a still further object of this invention to provide a method and apparatus to non-destructively determine the range of variation of the dynamic stress-strain property of rolls of distensible polymeric material.

It is yet another object of this invention to provide a method and means to wind tested distensible polymeric film into wrinkle-free rolls to facilitate handling and storage until used.

SUMMARY OF THE INVENTION

This invention relates to a method and an apparatus for ascertaining the dynamic stress-strain characteristic of ribbons of distensible polymeric film under simulated conditions of intended use.

The method of testing is to impose a constant tension in a moving ribbon of film parallel to the direction of moving the ribbon of film and then to impart uniform elongation within the elastic limit of the film, to the film parallel to the direction of moving the film at a constant rate whereby the tension induced by the elongation is added to the proceeding constant tension. The total tension in the elongated portion of film parallel to the direction of moving the film is continuously measured and recorded. Because the foregoing method is non-destructive, winding means can be provided to form the ribbon of film into a roll of film after measuring its dynamic stress-strain property to facilitate handling and storage prior to subsequent use.

The apparatus for determining the dynamic stress-strain property of ribbons of film comprises a constant controlled tension means forwarding the film to two pairs of constant surface velocity nip rolls in series forming a first nip between one pair of nip rolls and a second nip between the other pair of nip rolls the surface velocity of the pair of nip rolls forming the second nip being a fixed percentage greater than the surface velocity of the other pair of nip rolls forming the first nip for imparting uniform elongation to the film coursing between the nips, means for continuously sensing tension in the elongated film parallel to the direction of moving the film, and means for winding the film into rolls.

BRIEF DESCRIPTION OF THE DRAWING

While the specification concludes with claims particularly pointing out and distinctly claiming the subject matter which is regarded as the present invention, it is believed that the invention will be better understood by the description of the preferred embodiment taken in conjunction with the drawing which is a perspective schematic view of apparatus of the present invention.

DESCRIPTION OF THE PREFERRED EMBODIMENT

The structure necessary to support the functional elements, i.e., machine frame, bearings and the like are not shown in the drawing nor described in detail in order to simplify and more clearly depict and disclose the subject method and apparatus, it being understood that workers of ordinary skill in the art of designing converting machinery will find it well within their capability to supply such details.

Referring now to the drawing, film 10 is looped from the upper portion 11 of supply roll 12, over idler 17, under dancer roll 18, over idler 19, through first nip 20, over idler 25, under tension-sensing roll 27, over idler 29, through second nip 30, over spreader bar 85, over idler 17', under dancer roll 18', over idler 19' and thence onto the upper portion 88' of roll 88. Imaginary transverse lines in the film are all substantially horizontal, and all axes of rotation are substantially horizontal. The axes of all rotatable elements except dancer rolls 18, 18' are in mutually, space-fixed relation. The mountinG and movement of the axes of dancer rolls 18, 18' will be further described hereinafter.

Generally speaking, the apparatus of the preferred embodiment can be considered to comprise three major section: the constant tension supply 36 comprising first nip 20 and the elements located leftwardly therefrom on the drawing; elongation section 37 comprising first nip 20, second nip 30 and the elements therebetween; and constant tension winder 38 comprising second nip 30 and the elements spaced rightwardly therefrom. It is to be noted that first nip 20 performs functions in both the constant tension supply 36 and elongation section 37, while second nip 30 has functions in both the elongation section 37 and in the constant tension winder 38.

The constant tension supply 36 of the preferred embodiment unwinds a rolled ribbon of film and forwards it under constant controlled tension to elongation section 37. An unwind brake 40 is axially coupled to shaft 41 whereby it can provide anti-rotational torque to supply roll 12 keyed thereto to retard the otherwise free clockwise rotation of supply roll 12. Although braking torque could be provided through a variety of techniques and devices familiar to those skilled in the art, the illustrated embodiment uses a controllable torque, electromagnetic brake type TB–400 manufactured by Warner Electric Brake and Clutch Co., Beloit, Wisconsin having a maximum torque of 120 inch pounds. The torque available from the brake to retard clockwise rotation of shaft 41 is a function of D.C. voltage supplied to it by brake torque controller 50 which, for the illustrated embodiment, is a Warner Electric Tension Control Type MCS–201 also supplied by Warner Electric Brake and Clutch Company, Beloit, Wisconsin. Brake torque controller 50 comprises means to accept electrical power from a source (not shown) and to control the level of brake power 51. The brake power 51 output of controller 50 is a function of the position of unwind dancer 42 as described hereinafter. Thus, brake 40 acts in opposition to the action of first nip 20, which pulls film 10 to the right in the illustration whereby tension is induced in film 10 intermediate supply roll 12 and first nip 20.

Unwind dancer 42 comprises a freely rotatable dancer roll 18 mounted on shaft 43 which is pendulously supported from space-fixed rotatable shaft 44 on radial supports 45, 45. Supports 45, 45 are rigidly attached to shaft 44 so that translation of dancer roll 18 along the indicated arc 46 is manifested in rotation of shaft 44. Shaft 44 is axially connected to dancer position sensor 47 which develops electrical dancer position signal 48, a function of the rotational position of shaft 44 and therefore of the spatial position of dancer roll 18 on arc 46. Although a variety of rotational position sensors are familiar to those having ordinary skill and would be usable for dancer position sensor 47, a 1,000-ohm Econopot servo-potentiometer, model 78ESA102 available form the New England Instrument Co., Natick, Mass. has been found to be compatible with the Warner Electric controller delineated hereinbefore and is therefore used on the illustrated embodiment. It is operated by affixing its body to the unillustrated structure of the apparatus and by axially connecting its shaft (with its wiper affixed thereto) to shaft 44 hereinbefore noted. The Econopot is connected electrically to controller 50 so that the resistance of the potentiometer appears to the controller to be a function of the position of dancer 42 whereby controller 50 can establish a D.C. voltage output to brake 40 that will tend to maintain dancer 42 in a spaced-fixed position. The position of weights 49, 49 located on supports 45, 45 may be adjusted to add to or decrease gravity induced torque tending to swing pendulously-supported dancer roll 18 counterclockwise along arc 46. It will be recognized that tension deVeloped in film panels 10a and 10b act so as to balance gravitationally induced torque when the axis of dancer roll 18 is stationary. Dancer 42 preferably has low inertia for fast response to changes in film tension and is achieved in pre-ferred embodiments wherein two ounces of tension per inch of width per mil thickness in film panels 10a and 10b will balance the dancer as described.

First nip 20 comprises space-fixed, steel, drive niproll 55 and nip idler 56 which is pressure loaded downwardly towards driver niproll 55 by actuators 57, 57 which can be actuated by pneumatic, hydraulic or mechanical means, as desired. For example, in employing pneumatic means, compressed air from 0 – 80 p.s.i. can be used in actuators 57, 57 which are capable of developing a total of 500 pounds of force (hereinafter referred to as nip force) between driver niproll 55 and nip idler 56. Since the coefficient of friction between steel and polyethylene film is in the order of 0.2, a nip force of 500 pounds can exert up to about 100 pounds of pull on film passing through the nip.

Nip idler 56 comprises a steel cylinder 58 having a resilient neoprene cover 59 that will, when deformed by nip force, apply the nip force over an area of film rather than a line contact. The cover 59 thickness is desirably in the range of from about one-fourth inch to about three-fourths inch or preferably about one-half inch while the diameter of the roll is desirably about 4 inch.

Driving niproll 55 is fixed to a shaft 60 rotated at a constant speed by a gear 65 keyed thereto, whereby the surface velocity at nip 20 is constant. Shaft 60 is powered by drive motor 61 acting through shaft 62 and meshed gears 63, 64 and 65. The speed of drive motor 61 is maintained substantially constant by closed loop control 70 comprising tachometer generator 66, speed signal 67, constant speed drive controlled 68 and drive power 69 to drive motor 61, an arrangement which will be understood by those skilled in the use and application of closed loop speed controls. For instance, in the illustrated embodiment a General Electric CP–100 Direct Current Adjustable Speed Drive having one horsepower at 1,750 RPM and having tachometer feedback, supplied by the D. C. Motor and Generator Department, General Electric Co., Erie, Pa., was used for drive motor 61, tachometer generator 66 and Constant Speed Controller 68.

In operation, the constant tension supply section of the preferred embodiment maintains substantially constant tension in the ribbon of film intermediate supply roll 12 and first nip 20, as nip 20 pulls the ribbon of film 10 at constant velocity. This is achieved by controlling the torque of brake 40 acting in opposition to the pull of nip 20. To assist understanding how this is done, consider the system in equilibrium with film 10 traveling at constant velocity, with tension in film panels 10a and 10b balancing dancer 42 against gravitational forces. Then, as film 10 is used from supply roll 12, reducing the roll diameter, tension in film 10 will have a shorter moment arm through which it transmits clockwise torque to shaft 41. Since torque is force multiplied by the length of the moment arm, the torque tending to turn shaft 41 clockwise reduces as supply roll 12 is used. Thus, the retarding torque supplied by brake 40 to shaft 41 must be reduced proportionately to keep the system in equilibrium. Were the torque exerted by brake 40 not reduced, tension in film 10 would increase as the radius of supply roll 12 decreases in order to maintain a constant product of the radius of roll 12 and film tension. Increased tension thus induced in the film would overbalance gravitational forces acting on dancer 42 and dancer roll 18 would respond upwardly along the arc 46. Brake torque controller 50 cooperates with dancer position signal 48 in such a manner that displacement of dancer 42 along arc 46 will cause a decrease or increase in brake power 51 which reduces or increases the torque of brake 40 to maintain dancer 42 in dynamic balance.

The type of system described can be adjusted to maintain substantially constant machine direction tension in the film by having dancer 42 displaced only slightly along arc 46. For instance, substantially constant total machine direction tension in film 10 of about 2 pounds can be maintained throughout a supply roll radius change from 7 inches to 1.75 inches by a displacement of dancer 42 of about a half inch measured along arc 46. Because the radius of arc 46 is very large compared to such a half inch displacement, the geometry of the system is substantially constant whereby the dynamic balance of dancer 42 by tension in film panels 10a, 10b with gravitational forces remains relatively constant.

It will be understood that the constant tension supply, as hereinbefore described, will respond to changes other than supply roll radius changes and which would also tend to affect tension in film 10 intermediate supply roll 12 and first nip 20. For instance, if the cross section of roll 12 is eliptical or otherwise non-circular, constant angular velocity of the roll would cyclically increase or decrease the rate of unwinding film 10. The apparatus of the preferred embodiment would accommodate such an out-of-round supply roll by responding dancer movements and corresponding brake torque changes in accordance with the previous description. Thus, substantially constant tension will be maintained in the film passing into first nip 20 throughout a wide range of the radius of supply roll 12 resulting from use (slow rate of change) or non-circular cross section (relatively fast cyclical variations).

Elongation section 37 of the preferred embodiment comprises first nip 20, idler 25, tension-sensing roll 27, idler 29 and second nip 30, all of which are relatively spaced-fixed. Freely rotatable idler 25 is used to lead film portion 10c downwardly in a substantially vertical plane to freely rotatable tension-sensing roll 27 while idler 29 leads film panel 10d upwardly in a substantially vertical plane after film 10 had passed circumferentially around the lower half of tension-sensing roll 27. Thus, a substantially constant length, constant geometry looped path is established intermediate first nip 20 and second nip 30.

Tension-sensing roll 27 is freely rotatable on shaft 75 which is substantially space-fixed but has load cell 76 intermediate a first end and support structure and has load cell 76' intermediate its other end and additional support structure (neither of which are shown). Although a variety of transducers and associated data system components would be familiar to those having ordinary skill in the data acquisition art, the data system of the illustrated embodiment comprises a Dusenbery Model 60 Tension Indicator 78 equipped with a set of 400 inch pound load cells 76, 76' model number 817001, and a 2 ¼ inch dynamically balanced tension-sensing roll 27 with a 20 inch face all being available from the John Dusenbery Co., Inc. Clifton, New Jersey. Recorder 80, a Honeywell Electronik 19 Lab. Recorder, Model Number 193111–001–000 –01, used in the illustrated embodiment is available from the Honeywell Industrial Products Group, Honeywell, Inc., Philadelphia, Pa. The function of load cells 76, 76' will be described more fully hereinafter.

Second nip 30 is substantially identical to first nip 20 and corresponding members are identified by corresponding reference numerals to which primes (') have been affixed. Thus, steel driving roll 55', affixed to shaft 62, has nip idler 56' urged towards it by actuators 57', 57' thus imparting a nip force on film 10 passing therebetween.

Second nip 30 is driven at constant speed by drive motor 61 acting on shaft 62 as hereinbefore described. The speed of second nip 30 is a fixed percentage faster than first nip 20, as established by the gear train comprising gears 63, 64, and 65. Preferably, for testing thin (about 1 mil) polyethylene film the peripheral speed of the second nip lies in the range of from about 2 to about 6 percent, preferably about 4 percent, faster than that of the first nip. For instance, a gear 63 having 50 teeth would rotate 4 percent faster than a gear 65 having 52 teeth so that the second nip 30 would be about 4 percent faster than first nip 20. Thus, film coursing the looped path from nip 20 to nip 30 must elongate 4 percent therebetween.

In operation, film 10 elongates after it emerges from first nip 20 due to the tension in film 10 induced by second nip 30 operating faster than first nip 20 and due to the fixed geometry of the looped film path intermediate the nips. Thus, the tension required to elongate the film as described is added to the level of tension in the film supply.

Tension in film panels 10c, 10d acts upwardly on tension-sensing roll 27 whereby it is sensed by load cells 76, 76' having outputs 77, 77' proportional to force. Outputs 77, 77' are summed in tension indicator 78 which develops total tension signal 79 that is, in turn, recorded on recorder 80. Further details of tension measuring and recording are omitted since equipment and procedures are well known to those of ordinary skill in the art.

Constant tension winder 38 comprises second nip 30, spreader bar 85, idler 17', dancer 42', idler 19' and shaft 41' of roller 86 having spool 87 engaged thereon for forming new roll 88 of film 10 thereon, said shaft 41' being driven by controllable torque winding motor 40'.

It will be apparent without redundant detailed description that tension in the film panels 10e, 10f operates dancer 42' in the same manner as dancer 42 was described hereinbefore and that tension in the winding section is controlled substantially identically to the supply section except that the tension control device is motor 40' rather than brake 40. Although other suitable commercial equipment could readily be selected by those skilled in the art, an embodiment of the present invention has a Seco Modular Drive Model 2158RS with a plug-in Option Pak available from Seco Electronics Corp., Hopkins, Mass., for controller 50' in combination with a 2,000-ohm Econopot Model 78 ESA 202 Servo Potentiometer available from New England Instrument Co., Natick, Mass., for dancer position sensor 47'.

However, it has been found convenient and desirable to convert the position of dancer 42' into non-linear dancer position signal 48' through linkage comprising drum 95 axially coupled to shaft 44', and rod 96 having one end pivotally attached to drum 95 at point 97 spaced from its center of rotation and having its other end pivotally attached to dancer position sensor 47' at point 98 spaced from its center of rotation. By non-linearly converting dancer position data, the response of the winding torque control loop can be optimized. For instance, in an embodiment using a rod 96 2.875 inches long, when points 97 and 98 are 0.75 inch from their respective centers of rotation, and the centers of rotation are spaced 2 inches apart, rotating shaft 44' through 90° non-linearly rotates dancer position sensor 47' through an angle of only 78°, whereby the torque of motor 40' can be optimally controlled as the radius of a new roll of film increases from its minimum to its maximum. Weights 49', 49' are preferably located on supports 45', 45' to cause the winding system to continuously maintain approximately 2 to 3 ounces of tension per inch of width per mil thickness or preferably 2.5 ounces of tension per inch of width per mil thickness in film 10 in the winder section of the apparatus.

In the preferred embodiment, a transverse spreader bar 85 is provided which is constructed of steel, smooth and bowed from end to end. It is mounted so that it curves upwardly and downstream (rightwardly, as viewed in the drawing) from its ends to its center. It is positioned under the film intermediate second nip 30 and idler 17' so that it contacts the full width of the film whereby the film is transversely stressed to counteract any necking (reduction of width) of film 10 that occurs in elongation section 37 of the apparatus. This spreading promotes wrinkle free winding onto new roll 88. Although a variety of configurations utilizing this principle might be devised by persons having ordinary skill in the art, the illustrated embodiment utilizes a spreader bar 85 comprising a 25 inch length of circular steel tubing with one-eighth inch wall thickness that is formed into a segmental arch having a radius of curvature of approximately 156 inches.

In the illustrated embodiment, when set up for testing polyethylene film to be later converted at speeds of about 375 feet per minute, driving niprolls 55 and 55' can have 4-inch diameters, and driving niproll 55 can be driven at a surface velocity of about 375 feet per minute. Weights 49, 49 can be adjusted so that constant tension supply 36 maintains about 2 ounces of tension per inch of width per mil thickness and the ratio in the gear train comprising gears 63, 64 and 65 can be set to drive second nip 30 about four percent faster than first nip 20. Weights 49', 49' can be adjusted so that the winder maintains approximately 2.5 ounces of tension per inch of width per mil thickness in the film being wound into a new roll. Air pressure to actuators 57, 57, 57', 57' can be adjusted to exert approximately 250 pounds total force at each nip whereby slip between film and nip components is obviated.

Ideally, an apparatus for determining stress-strain in a ribbon of film by measuring tension induced by imparting uniform strain should have film supplied thereto under zero tension in the machine direction. Because it is impractical to supply a ribbon of film having zero tension at high velocity into an elongation apparatus, the present invention establishes a relatively small constant tension in the ribbon of film being supplied to the film elongation means. The constant tension in the supply is small relative to the tension induced by the subsequent elonGation as for instance, in the illustrated embodiment, 2 pounds total tension in the supply is about 10 percent of the tension induced by a 4 percent elongation of a 0.001 inch thick polyethylene film 16 inches wide.

It will be appreciated by those skilled in the art, that tension variations in the supply would be manifested as noise in the tension data. However, the apparent noise induced on the total tension signal would be commensurately small. For instance, for the described relationships a 10 percent variation of supply tension would only effect a variation amounting to about 1 percent of total tension. Thus, rather than supplying film from a roll under whatever tension it may have been wound, which may have been very random, and realizing the impracticality of transporting a ribbon of film at high speed under zero tension, the instant invention imposes a constant tension in the ribbon of film before straining it. The constant tension thus induced must be subtracted from the recorded data to get true stress-strain data.

In actual practice, the constant tension would appear as a constant offset in the data and so would not affect the range of stress-strain variability implicitly embodied in a strip chart recording. Thus average stress-strain and the range of stress-strain variability over the entire length of a roll of film can be ascertained directly from the recorder chart.

By testing ribbons of film as herein described, rolls can be segregated by ranges of stress-strain variability and be arranged in ascending or decending order of their average stress-strain. Subsequent usage in converting operations such as manufacturing disposable diapers is thereby improved because fewer compensating adjustments need be made to the converter and the amount of adjustment can be predicted through empirical methods.

Although the preferred embodiment herein described comprises means to supply a ribbon of film under constant tension from a rolled supply, it will be obvious that the invention could be adapted to in-line use as, for instance, in film manufacturing equipment. If used in this manner, it would be practical to use the data therefrom to control the manufacturing processes as well as for the normal data functions. Also, it is possible to consume the film in a converter after in-line testing, as taught herein, without rewinding. Were this to be done, compensating adjustments of the converter could be automated to respond to the acquired data.

Many other modifications of the present invention may be used and it is not intended to hereby limit it to the embodiments shown or described. The terms used in describing the invention are used in their descriptive sense and not as terms of limitation.

What is claimed is:

1. A method of determining the dynamic stress-strain characteristics of a moving constant-width ribbon of film of distensible polymeric material, said method comprising: inducing controlled constant tension in said film parallel to the direction of movement; thereafter causing a predetermined and constant elongation to occur in said film parallel to the direction of movement, said elongation being within the elastic limit of said film; and, measuring and recording total tension in said film parallel to the direction of movement while thus elongated, whereby the elongation induced tension in said film is said total tension less said initial controlled constant tension.

2. The method of claim 1 wherein said controlled constant tension is about 10 percent or less of the elongation induced tension.

3. The method of claim 1 further comprising winding said film into a roll of film after said measuring and recording.

4. The method of claim 2 further comprising winding said film into a roll of film after said measuring and recording.

5. The method of claim 4 wherein:
   A. said distensible polymeric film is polyethylene having nominal thickness of 0.001 inch;
   B. said controlled constant tension is approximately two ounces per inch of width of said ribbon of film; and
   C. said predetermined elongation is in the range from about 2 to about 6 percent.

6. The method of claim 5 wherein said predetermined elongation is about 4 percent.

7. The method of claim 6 wherein said film is supplied from a rolled ribbon of film.

8. The method of claim 4 wherein said predetermined elongation is about 4 percent and said film is maintained under constant tension during said winding into said roll of film, whereby said film is uniformly stressed until subsequently used.

9. The method of claim 8 wherein said film is supplied from a rolled ribbon of film.

10. Apparatus to non-destructively measure and record stress versus strain characteristics parallel to the direction of movement of a continuous ribbon of film of uniform width, said apparatus comprising:
    A. a frame structure;
    B. a tension-sensing roll;
    C. means for mounting said tension-sensing roll in said structure so that it is freely rotatable on its axis;
    D. stretching means for imparting uniform elongation to said film parallel to the direction of movement, said stretching means comprising two pairs of nip rolls rotatably secured to said structure with their axes substantially parallel to the axis of said tension-sensing roll, forming a first nip intermediate one said pairs and a second nip intermediate the other said pairs, said nips being spaced so that the film traverses a substantially constant length, constant geometry looped path including a circumferential portion of said tension-sensing roll intermediate said first nip and said second nip, said stretching means including means for driving said nip rolls at constant surface velocities so that their surface velocity at said second nip is a fixed percent greater than their surface velocity at said first nip whereby said film is elongated as it traversed the looped path;
    E. means for sensing and recording the tension in said film intermediate said nips by measuring the forces tending to displace the axis of said tension-sensing roll;
    F. means for maintaining constant tension in said film feeding into said first nip, said constant tension means comprising a controllable torque brake secured in part to said frame structure, closed-loop control means for controlling the controllable torque of said brake, and means for causing said brake to induce tension in said film proportional to the controllable torque; and
    G. means for winding said film into a roll of film after it passes through said second nip.

11. The apparatus of claim 10 wherein each said pairs of nip rolls comprise a driving roll and a freely-rotatable nip idler forming a said nip therebetween, said nip rolls being suitably urged towards one another by actuators whereby sufficient force can be applied to said film passing through said nips to impart the required tensions to said film.

12. The apparatus of claim 11 wherein said film is polyethylene having a thickness of about 0.001 inch and width of about 16 inches, said nip roll having a surface velocity of about 375 feet per minute at said first nip, said nip rolls having a surface velocity about 4 percent greater at said second nip than said first nip, said actuators being air operated are each sized to develop a maximum nip force of 500 pounds when supplied with 80 p.s.i. air, and said constant tension in said film feeding into said first nip is about 2 pounds, whereby the tension induced by said elongation is in the order of ten times said constant tension.

13. The apparatus of claim 12 wherein said winding means comprises means for maintaining substantially constant tension on said film parallel to the direction of moving as it is wound into said roll of film, and means for preventing wrinkles in said film beyond said second nip of said stretching means.

14. The apparatus of claim 13 wherein said constant winding tension is approximately 2.5 pounds and said wrinkle prevention means comprises a non-rotating smooth, curved transverse member secured to said frame structure having its center displaced upwardly and downstream from its ends, said member contacting the underside of said film across its full width intermediate said second nip and said roll of film whereby said film is bowed upwardly from its edges towards its middle causing transverse stress in said film that substantially prevents wrinkling of said film as it is wound into said roll of film.

* * * * *